United States Patent [19]

Takishima et al.

[11] Patent Number: 5,321,678
[45] Date of Patent: Jun. 14, 1994

[54] OPTICAL HEAD CARRIAGE, TRACKING MECHANISM AND DISPLACEMENT DETECTING MECHANISM

[75] Inventors: Suguru Takishima; Hiroshi Kanazawa; Isao Okuda; Shinpei Shinozaki, all of Tokyo, Japan

[73] Assignee: Asahi Kogaku Kogyo Kabushiki Kaisha, Tokyo, Japan

[21] Appl. No.: 928,311

[22] Filed: Aug. 12, 1992

[30] Foreign Application Priority Data

Aug. 13, 1991 [JP] Japan .................. 3-071541[U]
Aug. 13, 1991 [JP] Japan .................. 3-071542[U]

[51] Int. Cl.$^5$ ............................................ G11B 7/095
[52] U.S. Cl. ................................. 369/44.14; 369/44.16; 369/44.32; 369/54
[58] Field of Search .................... 369/44.14–44.16, 369/44.25, 44.32, 44.35–44.36, 54, 112, 118, 120; 359/813–814, 823–824

[56] References Cited

U.S. PATENT DOCUMENTS

| | | | |
|---|---|---|---|
| 4,769,803 | 9/1988 | Yamamiya | 369/112 X |
| 4,855,982 | 8/1989 | Orlicki et al. | 360/44.16 |
| 4,868,377 | 9/1989 | Nishikawa . | |
| 4,956,833 | 9/1990 | Kokado et al. | 369/54 X |
| 5,078,471 | 1/1992 | Takishima | 359/813 |
| 5,103,345 | 4/1992 | Watanabe et al. | 359/813 |
| 5,150,346 | 9/1992 | Minakuchi | 369/44.36 |
| 5,216,648 | 6/1993 | Noda et al. | 369/121 X |

FOREIGN PATENT DOCUMENTS

62-162241 7/1987 Japan .

Primary Examiner—W. R. Young
Attorney, Agent, or Firm—Sandler Greenblum & Bernstein

[57] ABSTRACT

An optical data recording and reproducing apparatus including an objective lens holder which holds an objective lens for converging laser light onto an optical disc, a tracking mechanism which drives the objective lens holder in a tracking direction of the optical disc, and a displacement detecting mechanism which detects the displacement of the objective lens holder effected by the tracking mechanism. The displacement detecting mechanism has photosensors which have light emitters and light receivers. The light receivers are located further from the optical disc than the light emitters. The photosensors are supported on a single sensor holder.

16 Claims, 7 Drawing Sheets

FIG. 14a — Output of Photosensors 20A, 20B vs Position of Objective Lens 5

FIG. 14b — Output of Differential Amplifier 23 vs Displacement of Objective Lens 5

FIG. 15a — Output of Photosensors 20A, 20B vs Position of Objective Lens 5

FIG. 15b — Output of Differential Amplifier 23 vs Displacement of Objective Lens 5 (Offset)

OPTICAL HEAD CARRIAGE, TRACKING MECHANISM AND DISPLACEMENT DETECTING MECHANISM

BACKGROUND OF THE INVENTION

1. Field of the Invention

The present invention relates to an optical data recording and reproducing apparatus (hereinafter referred to as an optical disc apparatus) which records optical data onto an optical recording medium, such as a magnetic optical disc, and reproduces the recorded data from the optical recording medium. More precisely, it relates to an improved carriage (optical head) which is moved in the tracking direction across data recording tracks, formed circumferentially on the optical disc thereof, to record and reproduce optical data.

2. Description of Related Art

In a known optical disc apparatus, such as a magnetic optical disc apparatus, an objective lens is supported by an objective lens holder which is movable in both the focusing direction and the tracking direction of the optical disc on a carriage. Namely, the movable objective lens holder, on which the objective lens is supported, is provided with focusing and tracking coils which, together with a magnetic circuit provided on the carriage constitute an electromagnetic drive mechanism. The carriage holds a mirror which reflects laser light emitted from a stationary optical system in the radial direction of the optical disc toward the objective lens. The focusing and tracking coils are supplied with a predetermined intensity and direction of electric current to precisely converge the laser light onto a predetermined recording track of the optical disc to thereby control the focusing and tracking operations.

In the known optical disc apparatus mentioned above, it is necessary to detect the position of the objective lens (lens holder), particularly in the radial direction (tracking direction) of the optical disc, to thereby determine a deviation from a correct position and reduce access time. To this end, a detector, which uses a photosensor, is incorporated in the optical disc apparatus.

The detector comprises, for example, a pair of reflectors (reflecting plates) provided on opposite sides of the lens holder in the tracking direction, and reflection type photosensors, opposed to the reflectors and secured to the carriage. Each photosensor has a pair of light emitting and receiving elements, so that the radial position of the objective lens can be detected in accordance with a difference in output between the two photosensors, depending on the displacement of the objective lens in the radial direction (tracking direction), to thereby control the position of the objective lens.

However, in the conventional optical disc apparatus, it is necessary to provide the photosensors in the vicinity of the objective lens. Accordingly, light reflected by the optical disc is made incident upon the photosensors and causes an error of measurement by the photosensors.

Furthermore, if the characteristics of the photosensors are identical, the photosensors must be positioned at equal distances from the reflectors of the lens holder. This however makes it difficult to independently adjust the position of the photosensor, however.

In addition to the foregoing, it is premised that the reflection type photosensors have an identical output characteristic, but, in practicality, it is very difficult to realize identical output characteristics in the two photosensors. If the output characteristics of the two photosensors are not identical to each other, there will be a measurement error in the detection of the position of the objective lens using the output difference of the two photosensors. Consequently, upon initial adjustment of the position of the photosensors, in accordance with the outputs thereof, the distances of the photosensors from the lens holder are not identical to each other. To compensate for this, it is necessary to independently adjust the distances of the photosensors from the reflectors provided on the lens holder. However, this is troublesome and complicated.

SUMMARY OF THE INVENTION

The primary object of the present invention is to provide an optical disc apparatus in which no measurement error of the photosensors occurs, so that a precise tracking control can be carried out.

Another object of the present invention is to simplify the initial adjustment of the photosensors in an optical disc apparatus so that the radial position of the objective lens can be precisely controlled.

According to an aspect of the present invention, there is provided an optical data recording and reproducing apparatus, comprising an objective lens holder which holds an objective lens for converging laser light onto an optical disc, a tracking mechanism which drives the objective lens holder in a tracking direction (i.e., radial direction of the optical disc), and a displacement detecting mechanism which detects a displacement of the objective lens holder effected by the tracking mechanism. The displacement detecting mechanism comprises a photosensor having light emitting and light receiving elements located relatively near and far from the optical disc, respectively.

According to another aspect of the present invention, there is provided an optical data recording and reproducing apparatus comprising a carriage which is moved in the radial direction of an optical disc, an objective lens holder which is movably supported on the carriage, a pair of reflecting plates provided on opposite sides of the objective lens holder in the tracking direction, and a pair of reflection type photosensors provided on the carriage. Each of the reflection type photosensors is positioned opposite one of the reflection plates. Further, each of the reflection type photosensors comprises light emitting and receiving elements which are positioned such that light emitted from the light emitting element will not be made incident upon the optical disc. Alternatively, should light be emitted from the light emitting element and reflected by the optical disc, the light emitting and receiving elements are positioned such that the light reflected by the optical disc is not received by the light receiving element.

According to still another aspect of the present invention, an optical data recording and reproducing apparatus comprises a carriage which is moved in the radial direction of an optical disc, an objective lens holder which is movably supported on the carriage, a pair of reflecting plates provided on opposite sides of the objective lens holder in the tracking direction, and a pair of reflection type photosensors positioned opposite corresponding reflecting plates. Each of the reflection type photosensors includes light emitting and receiving elements. The optical data recording and reproducing apparatus further includes a single sensor holder which holds the reflection type photosensors, and a position adjusting means for adjusting the position of the sensor holder on the carriage in the radial direction of the optical disc.

An optical data recording and reproducing apparatus according to the present invention is characterized by a single sensor holder which supports both of the photosensors and is movable to adjust the distance between the photosensors and the objective lens holder.

According to the present invention, an improvement is directed to a special arrangement of each photosensor, wherein the light emitter of the photosensor is located closer to the optical disc than the light receiver.

The present disclosure relates to subject matter contained in Japanese utility model application Nos. 3-71541 and 3-71542 (both filed on Aug. 13, 1991) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENTS

Figure 5:
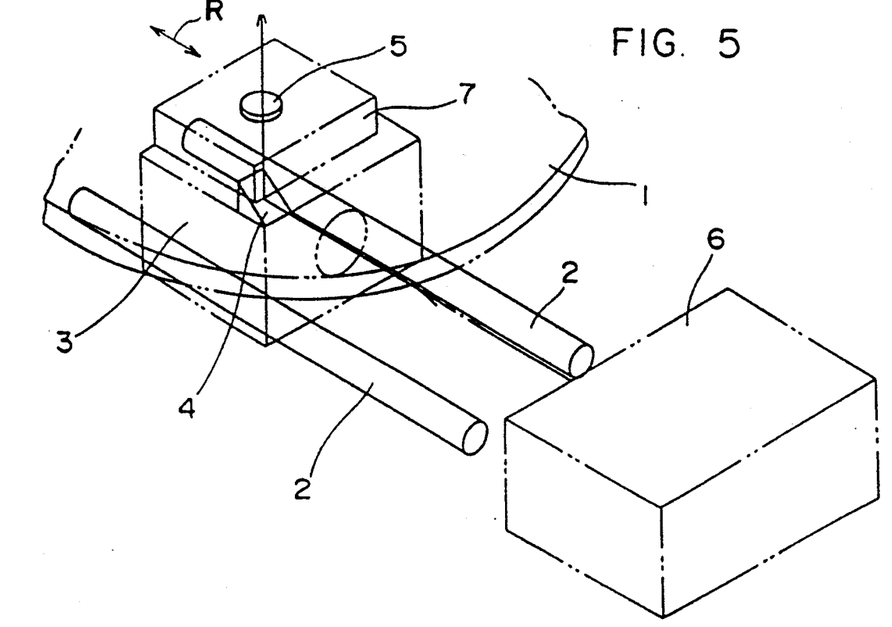
FIG. 5 is a perspective view of an entire optical disc apparatus to which the present invention is applied.

As can be seen in FIG. 5, a pair of guide rails 2 are provided below the lower surface of an optical disc 1 and extend in the radial direction of the optical disc 1. A carriage 3 moves along the guide rails 2. Carriage 3 is provided with a prism 4, which comprises a means for perpendicularly reflecting light emitted from a stationary optical system 6. Carriage 3 is also provided with an objective lens, driving device 7, which supports an objective lens 5. Objective lens 5 converges light reflected by the prism 4 onto the optical disc 1 to form an image.

Figure 1:
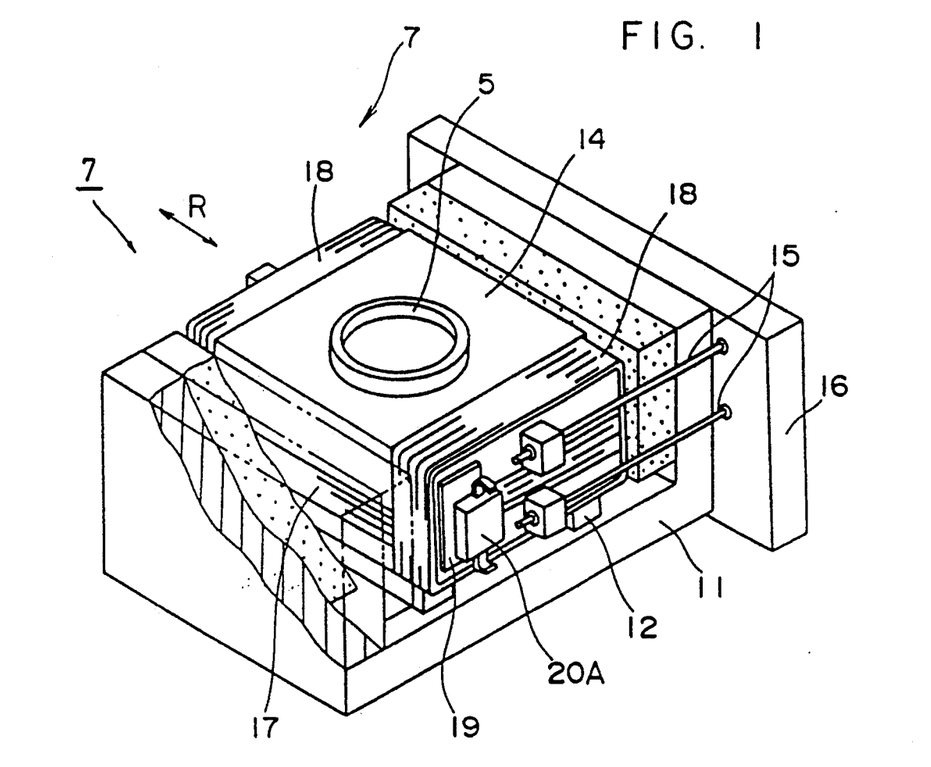
FIG. 1 is a partially broken perspective view of an objective lens driving device and surrounding elements thereof in an optical disc apparatus, according to a first embodiment of the present invention.
Figure 2:
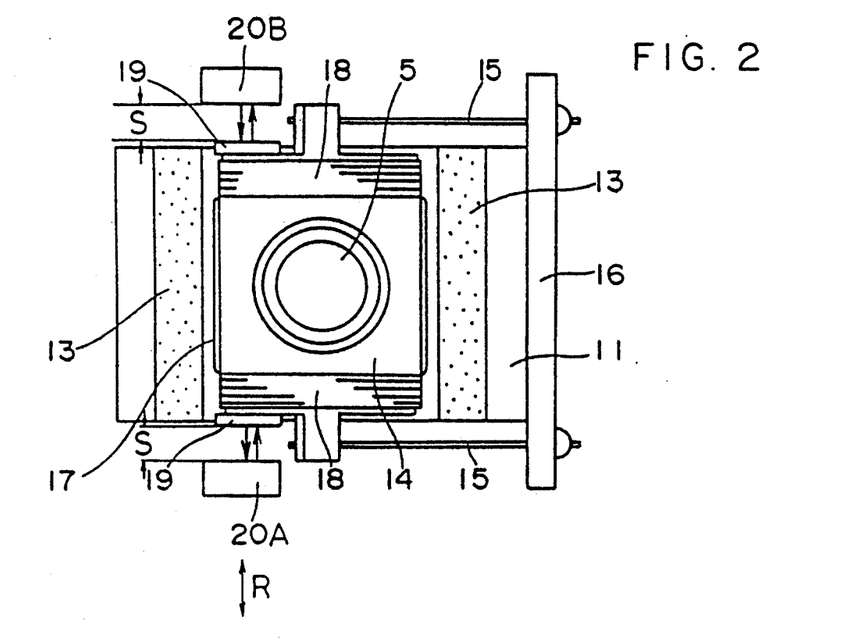
FIG. 2 is a plan view of the objective lens driving.
Figure 3:
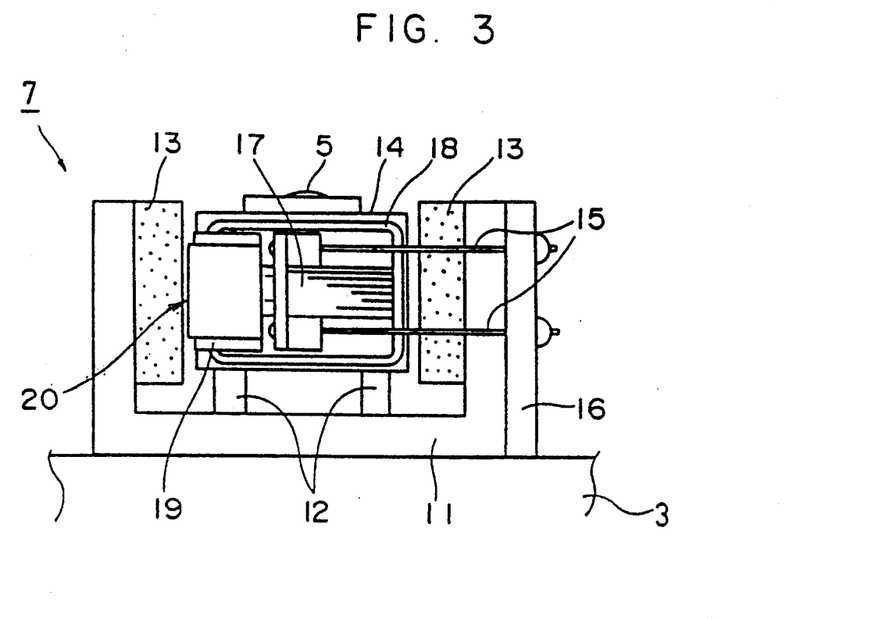
FIG. 3 is a front elevational view of the objective lens driving device shown in FIG. 1; o

Objective lens driving device 7 includes a yoke assembly having a generally U-shaped outer yoke 11, and two inner yokes 12 located between the outer yoke 11, as shown in FIGS. 1 through 3. The yoke assembly, which is secured to the upper surface of the carriage 3, is provided on the bottom surface thereof with a window (not shown) through which light reflected by the prism 4 is transmitted. The yoke assembly, together with magnets 13 held on the inner walls of the side plates of the outer yoke 11, between the outer yoke 11 and the associated inner yokes 12, define two magnetic fields.

An objective lens holder 14 is located in the magnetic fields, and is provided on the side faces thereof with a focus driving coil 17 wound in the horizontal direction, and radial driving coils 18 wound in the vertical direction of the holder 14.

Objective lens holder 14 is provided on the upper surface thereof with a center opening through which the light reflected by the reflecting mirror (prism) 4 is transmitted. The objective lens 5 is secured to the peripheral edge of the center opening by means of an adhesive.

Lens holder 14 has a pair of suspension wires 15 on each side face thereof for securing the same to a supporting wall 16 formed on the carriage 3. The suspension wires 15 define a cantilever support. The suspension wires 15 can be elastically deformed in the vertical direction (direction of thickness of the optical disc) and in the horizontal direction (radial direction R of the optical disc) about the connecting points of the suspension wires 15 and the supporting wall 16. Consequently, the lens holder 14 can be moved in the vertical and horizontal directions when the lens holder 14 is subject to electromagnetic force.

Figure 6:
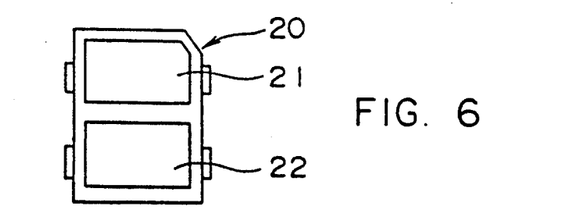
FIG. 6 is a front elevational view of a reflection type photosensor, according to the present invention.

A pair of reflecting plates 19 are secured to the side walls of the lens holder 14. The reflecting plates 19 are opposite a pair of reflection type photosensors 20 (20A and 20B) which are held by the carriage 3 through a sensor holder (not shown). Each of the photosensors 20A and 20B has an integral light emitter 21 and light receiver 22, so that light emitted from the light emitter 21 and reflected by the associated reflecting plate 19 is received and detected by the light receiver 22, as shown in FIG. 6. The output of the light receivers 22, is shown in FIG. 7 in which the collector current I varies in accordance with the distance S between the photosensors 20A and 20B and the corresponding reflecting plates 19.

Figure 7:
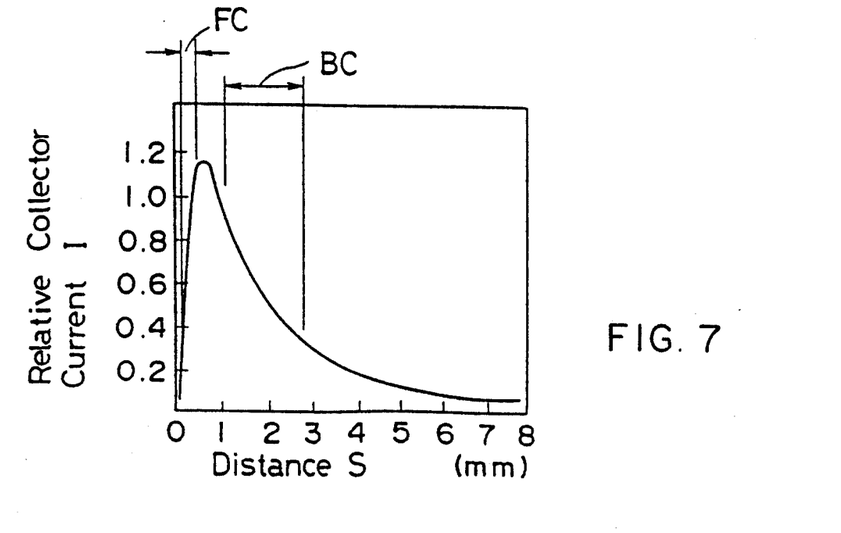
FIG. 7 is a diagram of characteristics of the reflection type photosensor shown in FIG. 6.

As can be seen in FIG. 7, there are two linear variation areas of the outputs of the photosensors with respect to the displacement of the objective lens, a front slope characteristic FC and a rear slope characteristic BC. The rear slope characteristic BC, which covers a broader range than the front slope characteristic FC, is usually used to detect the displacement of the objective lens, but it is also possible to use the front slope characteristic FC, particularly when the displacement of the objective lens must be detected at a higher precision.

Figure 8:
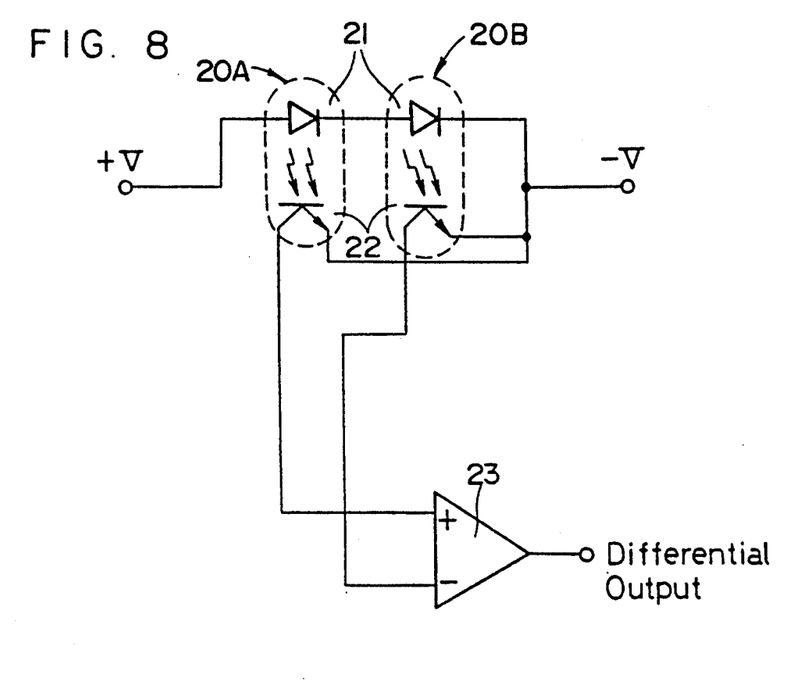
FIG. 8 is a circuit diagram showing an electrical connection of a pair of photosensors, according to the present invention.
Figure 9:
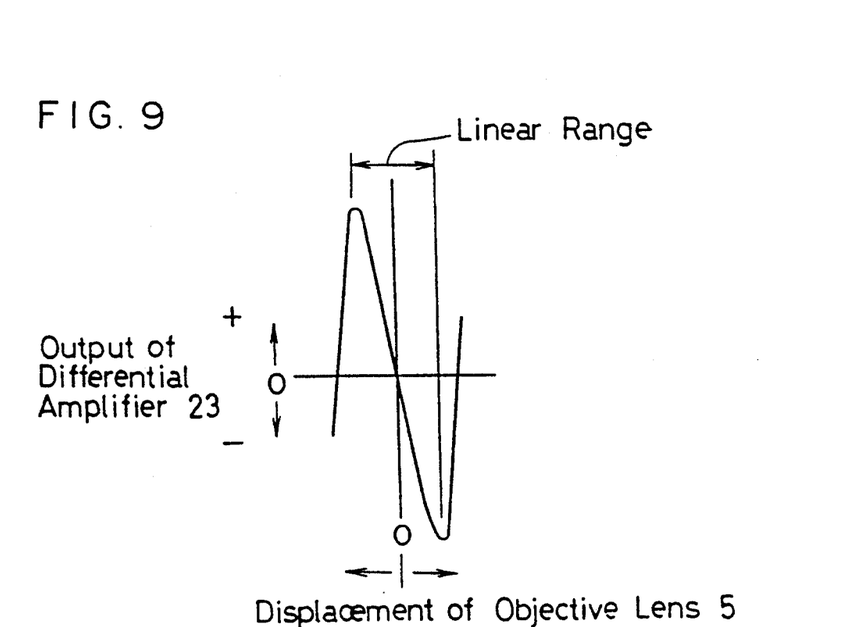
FIG. 9 is a diagram showing a detection output and a displacement of a pair of photosensors, according to the present invention.
Figure 10:
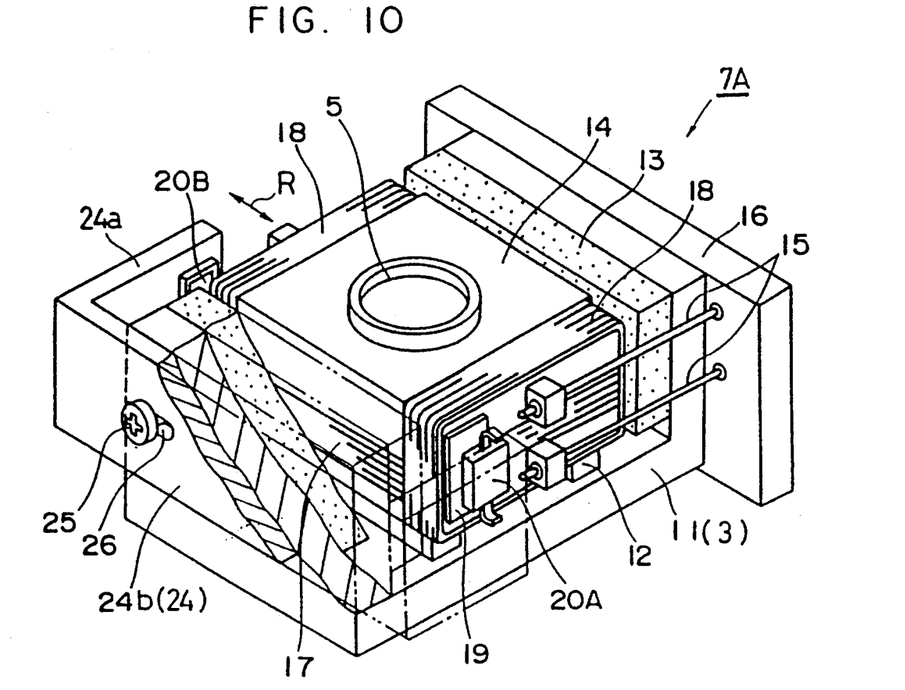
FIG. 10 is a partially broken perspective view of an objective lens driving device and surrounding elements thereof in an optical disc apparatus, according to a second embodiment of the present invention.
Figure 11:
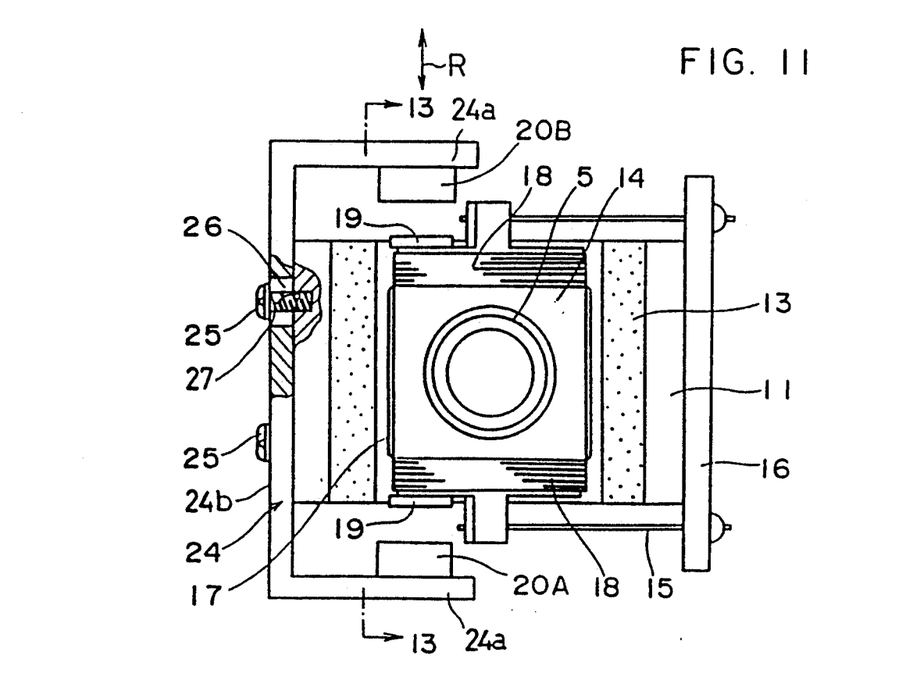
FIG. 11 is a plan view of the objective lens driving device and surrounding elements shown in FIG. 10.
Figure 12:
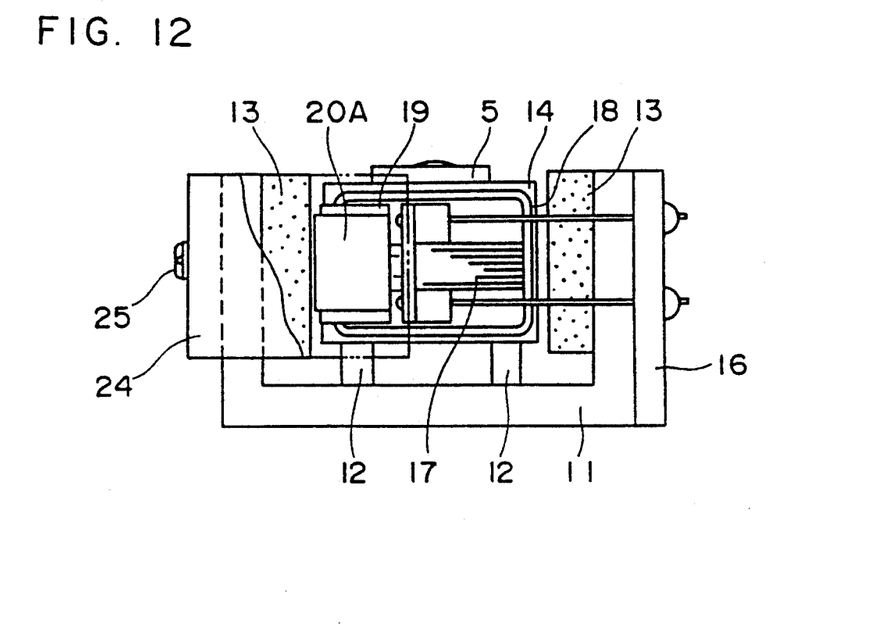
FIG. 12 is a front elevational view of the objective lens driving device and surrounding elements shown in FIG. 10.
Figure 13:
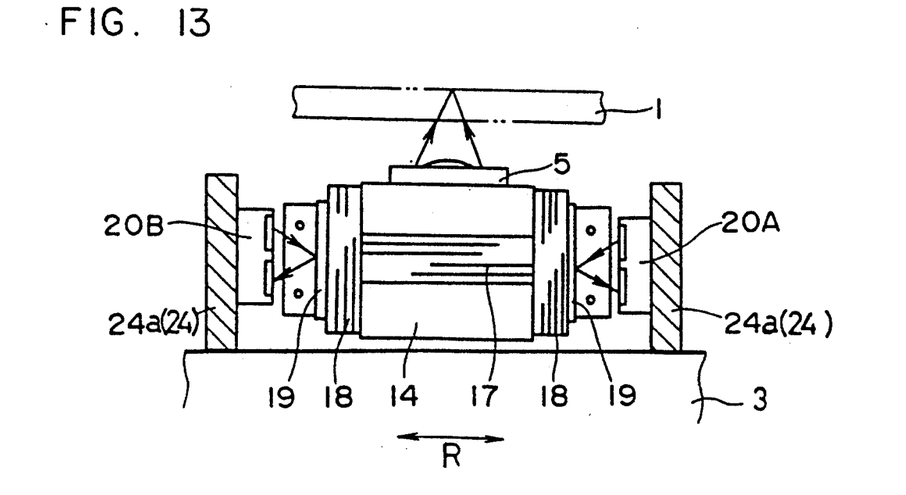
FIG. 13 is a sectional view of the objective lens driving device and surrounding elements taken along the line 13—13 in FIG. 11.

The light emitters 21 of the photosensors 20A an 20B are connected to a power source (e.g., battery), and the light receivers 22 of the photosensors 20A and 20B are connected to positive and negative terminals of a differential amplifier 23, respectively, as shown in FIG. 8. The output difference of the light receivers 22 can be detected by the differential amplifier 23 to obtain differential output characteristics as shown in FIG. 9.

Consequently, the distance between the photosensors 20A and 20B and the associated side surfaces of the lens holder 14 (i.e., surfaces of the reflecting plates 19) can be detected in accordance with the output of the differential amplifier 23 to detect the radial deviation of objective lens 5 from the proper location thereof.

Figure 4:
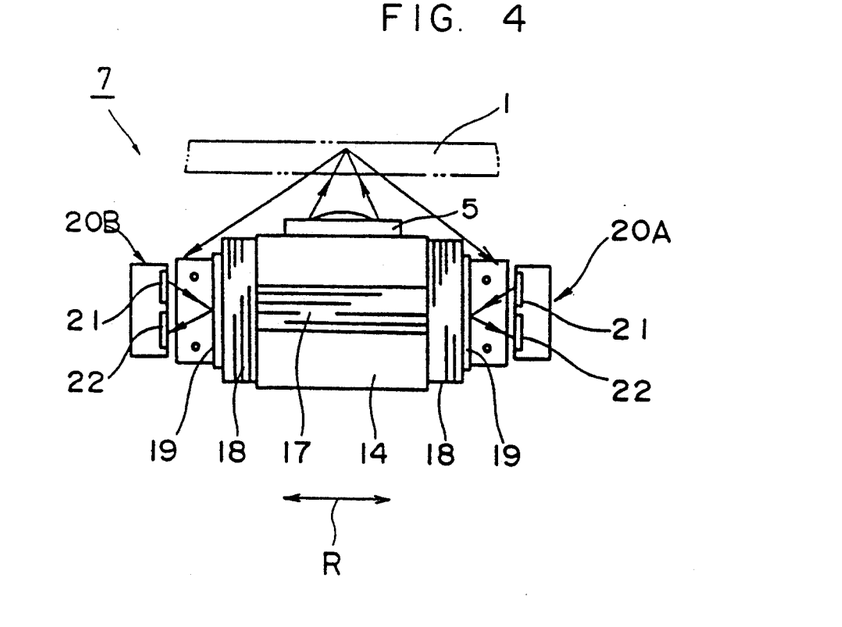
FIG. 4 is a left side elevational view of a main part of the objective lens driving device shown in FIG. 1.

The light emitter 21 and the light receiver 22 of each of the photosensors 20A and 20B are located one above the other, as shown in FIG. 4. Namely, the upper light emitter 21 is located closer to the optical disc 1 than the lower light receiver 22. Therefore, light emitted from the light emitters 21 are reflected by the reflecting plates 19 toward the corresponding lower light receivers 22 at a predetermined reflection angle, so that the light can be detected by the light receivers 22.

In the optical disc apparatus as constructed above, if part of the light, incident upon the optical disc 1 from the objective lens 5, and reflected by the optical disc 1, reaches the photosensors 20A and 20B, as shown at by arrows in FIG. 4, light leakage (reflected light) from the optical disc 1 is not received by the light receivers 22, since the light receivers 22 are located farther from the optical disc 1 than the light emitters 21. Consequently, the output of the light receivers 22 is not substantially influenced by the light leakage, resulting in a precise detection of the position of the lens holder 14, and a high quality control of the objective lens.

As can be understood from the above discussion, according to the present invention, since the light emitters of the photosensors are located on opposite sides of the objective lens assembly, and since the light receivers of the photosensors are located on the part of the photosensor farther from the optical disc, even if light partly reaches the photosensors, little or no light will be received by the light receivers, thus preventing a detection error of the photosensors from occurring. Accordingly, the position of the objective lens can be precisely detected, leading to a precise radial control thereof.

FIGS. 10 through 15 show another embodiment of the present invention, in which like elements are designated with the same reference numerals as those in the first embodiment illustrated in FIGS. 1 through 9.

One of the most significant features of the second embodiment resides in a single sensor holder 24 which is secured to the carriage 3 and which supports the photosensors 20A and 20B.

The sensor holder 24 has a pair of opposed arms 24a, and a web portion 24b connecting the arms 24a, to define a generally U-shaped cross-section. The reflection type photosensors 20A and 20B are mounted to the associated arms 24a of the sensor holder 24. The web portion 24b of sensor holder 24 is secured to the outer yoke 11 by set screws 25. The web portion 24 has elongated holes 26 through which the corresponding set screws 25 are inserted. Set screws 25 are screwed into threaded holes 27 formed in the outer yoke 11. The elongated holes 26 extend in the lengthwise direction of the sensor holder 24. The position of the sensor holder 24 is therefore adjustable in the longitudinal direction of the elongated holes 26 (i.e., radial direction R of the optical disc) when the set screws 25 are loosened to adjust the distance of the photosensors 20A and 20B from the associated reflecting plates 19 of the lens holder.

The positional arrangement of the light emitters 21 and the light receivers 22, of the photosensors 20A and 20B, is identical to that in the first embodiment mentioned above. Nevertheless, it should be appreciated that if an inverted arrangement is used in which the light receivers are located closer to the optical disc than the light emitters, the single sensor holder 24 common to the photosensors 20A and 20B can still be employed.

In the aforementioned second embodiment of the present invention, when the set screws 25 of the sensor holder 24 are loosened to adjust the sensor holder in the radial direction R of the optical disc 1, the distances between the photosensors 20A and 20B and the reflecting plates 19 provided on the lens holder opposite the associated photosensors can be simultaneously adjusted in the opposite directions.

Figures 14A, 14B:
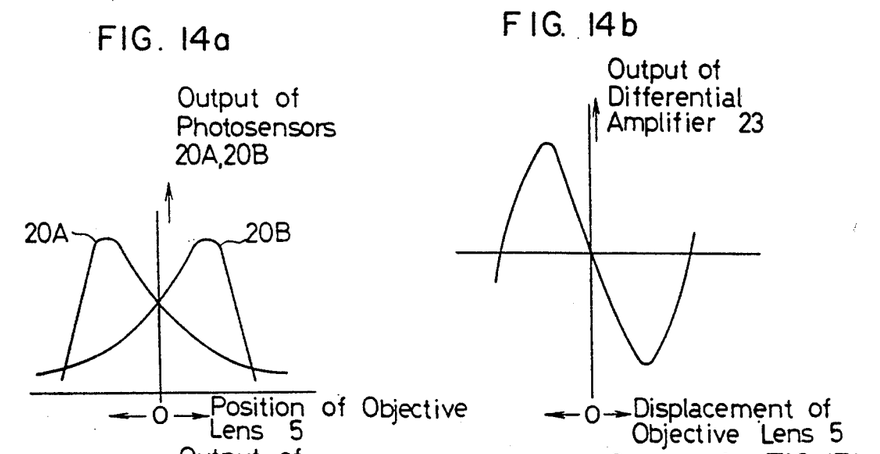
FIGS. 14a and 14b are diagrams showing a detection output and displacement of a pair of photosensors, according to the second embodiment of the present invention; and, FIGS. 15a and 15b are diagrams showing a detection output and displacement of a pair of photosensors when there is a difference (offset) in the output between the photosensors.

On the assumption that the differential output characteristics of the photosensors 20A and 20B are identical (symmetrical), as shown in FIG. 14a, the displacement (deviation) of the objective lens 5 can be precisely detected in accordance with the characteristics shown in FIG. 14b (identical to those shown in FIG. 9) merely by adjusting the sensor holder 24 so that the distance between the photosensor 20A and the associated reflecting plate 19 is identical to the distance between the photosensor 20B and the associated reflecting plate 19.

Figures 15A, 15B:
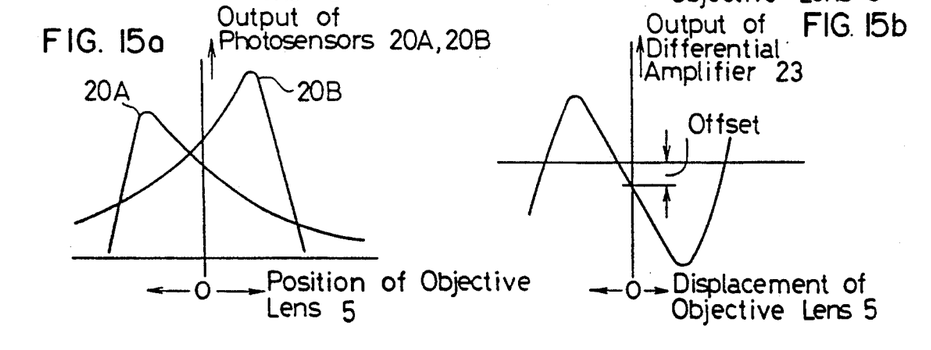

However, if there is a difference (offset) in the characteristics of the photosensors 20A and 20B, as shown in FIG. 15a, it is necessary to adjust the sensor holder 24 in accordance with the offset. Namely, the sensor holder 24 is adjusted so that the distance between the photosensor 20A and the associated reflecting plate 19 is different from the distance between the photosensor 20B and the associated reflecting plate 19, thereby eliminating the offset. Consequently, the lens holder 14 can be set so that the differential output characteristics of the photosensors 20A and 20B is centered, as shown in FIG. 15b. Namely, the distance between the photosensor 20A and the associated reflecting plate 19 is adjusted to be larger or smaller than the distance between the photosensor 20B and the associated reflecting plate 19, so that the output of the differential amplifier 23 is 0 (zero) at an initial (reference) position where no drive force is applied to the objective lens 5.

As can be seen from the above discussion, according to the second embodiment of the present invention, since a pair of photosensors opposite the side surfaces of the objective lens holder are adjustably mounted to a common sensor holder so that the distances between the photosensors and the lens holder can be adjusted, offset of the differential output of the photosensors from a correct value can be effectively absorbed by appropriate adjustment of the sensor holder position to set the initial positions of the photosensors, resulting in a precise radial control of the objective lens.

We claim:

1. An optical data recording and reproducing apparatus comprising:
   an objective lens holder which holds an objective lens for converging laser light onto an optical disc;
   a tracking mechanism which drives the objective lens holder in a tracking direction of the optical disc;
   a carriage which is movable in the tracking direction and which supports said objective lens holder;

a single sensor holder extending adjacent opposite sides of said objective lens holder and supported by said carriage; and, a displacement detecting mechanism which detects a displacement of the objective lens holder effected by the tracking mechanism, said displacement detecting mechanism comprising a photosensing means comprising a pair of photosensors supported on said single sensor holder on opposite sides of said single sensor holder.

2. An optical data recording and reproducing apparatus according to claim 1, wherein said objective lens holder is provided with a pair of reflectors on said opposite sides thereof.

3. An optical data recording and reproducing apparatus according to claim 2, wherein said pair of photosensors are located opposite said pair of reflectors, respectively.

4. An optical data recording and reproducing apparatus according to claim 1, wherein said sensor holder is substantially U-shaped, and the sides of the U-shape extend along said opposite sides of said objective lens holder, said pair of photosensors being supported on opposite sides of said U-shape.

5. An optical data recording and reproducing apparatus according to claim 4, further comprising an adjusting means for adjusting a position of said sensor holder on said carriage in the radial direction of the optical disc.

6. An optical data recording and reproducing apparatus according to claim 5, wherein said adjusting means comprises at least one elongated hole formed in said sensor holder and extending in the tracking direction of the optical disc, at least one set screw which is inserted through said elongated hole, and said carriage having at least one threaded hole formed therein into which said set screw is screwed to fasten said sensor holder to said carriage.

7. An optical data recording and reproducing apparatus according to claim 1, each of said pair of photosensors further comprising light emitting and light receiving elements located near and far from the optical disc, respectively.

8. An optical data recording and reproducing apparatus comprising:

a carriage which is moved in the radial direction of an optical disc;

an objective lens holder which is movably supported on said carriage;

a pair of reflectors provided on opposite sides of said objective lens holder in the tracking direction;

a single sensor holder extending adjacent said opposite sides of said objective lens holder and supported by said carriage; and, a pair of reflection type photosensors provided on said single sensor holder, wherein each of said reflection type photosensors is positioned opposite one of said reflectors, and wherein each of said reflection type photosensors comprises light emitting and receiving elements which are positioned such that light emitted from said light emitting elements will not be made incident upon the optical disc.

9. An optical data recording and reproducing apparatus according to claim 8, wherein said light emitting elements of said photosensors are located closer to the optical disc than said light receiving elements thereof.

10. An optical data recording and reproducing apparatus according to claim 8, further comprising an adjusting means for adjusting a position of said sensor holder on said carriage in the radial direction of the optical disc.

11. An optical data recording and reproducing apparatus comprising:

a carriage which is moved in the radial direction of an optical disc;

an objective lens holder which is movably supported on the carriage;

a single sensor holder extending adjacent opposite sides of said objective lens holder and supported by said carriage;

a pair of reflectors provided on opposite sides of the objective lens holder in the tracking direction; and, a pair of reflection type photosensors provided on said single sensor holder, wherein each of said reflection type photosensors is positioned opposite one of said reflectors, and wherein each of said reflection type photosensors comprises light emitting and receiving elements which are positioned such that light emitted from an objective lens held by said objective lens holder and reflected by the optical disc is not received by said light receiving element.

12. An optical data recording and reproducing apparatus comprising:

a carriage which is moved in the radial direction of an optical disc;

an objective lens holder which is movably supported on said carriage;

a pair of reflectors provided on opposite sides of said objective lens holder in the tracking direction;

a pair of reflection type photosensors positioned opposite respective reflectors, each of said reflection type photosensors including light emitting and receiving elements;

a single sensor holder that holds said reflection type photosensors; and, a position adjusting means for adjusting the position of said sensor holder on said carriage in the radial direction of the optical disc.

13. An optical data recording and reproducing apparatus according to claim 12, wherein said position adjusting means adjusts the distances of said pair of photosensors with respect to the associated reflectors in a manner such that when the distance between one of said pair of photosensors and the associated reflecting plate increases, the distance between the other of said pair of photosensors and the associated reflecting plate decreases.

14. An optical data recording and reproducing apparatus according to claim 13, wherein said sensor holder has two arms and an intermediate web portion connecting said arms to define a generally U-shaped cross-section.

15. An optical data recording and reproducing apparatus according to claim 14, wherein said photosensors are supported on said arms of said sensor holder.

16. An optical data recording and reproducing apparatus according to claim 15, wherein said position adjusting means comprises a web portion of a sensor holder having at least one elongated hole formed thereon and extending in the tracking direction, at least one set screw which is to be inserted through said elongated hole, and said carriage having at least one threaded hole formed thereon into which said set screw is screwed to fasten said sensor holder to said carriage.

* * * * *